United States Patent [19]

Schneck

[11] 4,189,867
[45] Feb. 26, 1980

[54] HYDROPONIC UNIT

[76] Inventor: Stuart Schneck, 766 Teresita Blvd., San Francisco, Calif. 94127

[21] Appl. No.: 870,477

[22] Filed: Jan. 18, 1978

[51] Int. Cl.² .................... A01G 31/02; A01G 25/06
[52] U.S. Cl. ........................................... 47/62; 47/79
[58] Field of Search ..................... 47/79, 59–64, 47/80, 81, 76, 14; 119/5

[56] References Cited

U.S. PATENT DOCUMENTS

| | | | |
|---|---|---|---|
| 1,491,057 | 4/1924 | Myers | 417/174 |
| 2,278,991 | 4/1942 | Hasslacher et al. | 47/79 X |
| 2,306,027 | 12/1942 | Swaney | 47/79 |
| 2,709,838 | 6/1955 | Zausner | 47/79 X |
| 2,776,642 | 1/1957 | Sepersky | 119/5 |
| 3,018,758 | 1/1962 | Arnould | 119/5 |
| 3,550,319 | 12/1970 | Gaines, Jr. | 47/79 |
| 3,738,060 | 6/1973 | Jullien-Davin | 47/81 |
| 3,766,684 | 10/1973 | Kato | 47/62 |
| 3,992,809 | 11/1976 | Chew | 47/62 |
| 4,016,677 | 4/1977 | Julinot | 47/64 |
| 4,021,964 | 5/1977 | Darwin et al. | 47/62 |
| 4,057,930 | 11/1977 | Barham | 47/79 X |
| 4,083,147 | 4/1978 | Garrick | 47/80 |

FOREIGN PATENT DOCUMENTS

| | | | |
|---|---|---|---|
| 2222505 | 11/1973 | Fed. Rep. of Germany | 119/5 |
| 1464181 | 11/1966 | France | 47/81 |
| 11890 | of 1900 | United Kingdom | 47/81 |
| 1192431 | 5/1970 | United Kingdom | 47/81 |
| 212661 | 5/1968 | U.S.S.R. | 47/59 |

Primary Examiner—Edgar S. Burr
Assistant Examiner—Steven A. Bratlie
Attorney, Agent, or Firm—Townsend and Townsend

[57] ABSTRACT

A plastic tray having short legs and a perforated bottom fits securely within a plastic container, the tray being adapted for carrying vermiculite and the container being adapted for holding nutrient solution. The tray also has an enlarged upper portion defining a channel-shaped inner ledge between the enlarged and unenlarged portions thereof. An electric pump is disposed within a compartment of the tray, and a plastic tube runs from the pump into the nutrient solution and up the wall of the tray to the channel-shaped ledge, into which it snaps along the sides of the tray. The tube is perforated where it contacts the nutrient solution, and has a series of apertures along the portion snapped to the walls of the tray, such that a mixture of air and nutrient solution can be pumped through the tube into the vermiculite.

8 Claims, 4 Drawing Figures

HYDROPONIC UNIT

BACKGROUND OF THE INVENTION

This invention relates to hydroponic units and more particularly to a window-box size unit having an automatic irrigation system.

The use of plant boxes in hydroponic gardening has long been known. See, for example, U.S. Pat. No. 2,189,510, disclosing a box or tank for growing flowers, vegetables and other plants. See also U.S. Pat. No. 3,667,157; U.S. Pat. No. RE 21,820; and U.S. Pat. No. 3,134,195. Such hydroponic units have not been widely used, primarily because of problems as to providing the plants with sufficient nutrient solution to obtain adequate growth. More recently, hydroponic units using automatic irrigation systems have been developed. In these units, an electric pump is used to pump an air-nutrient solution mixture into a box or tray holding the growing medium and plants. A variety of tubes, pumps, and clamps are currently being used in such systems, for the pumping of the air-nutrient solution mixture into the growing medium for absorption and use by the plants placed therein. In one such unit, irrigation tubes in the form of a "T" with extensions from the arms of the "T" are positioned in the growing medium and connected to a pump, whereas in another unit an airline runs directly from a pump to a nutrient solution tube, to cause the air-nutrient solution mixture to pass through the bottom of the growing medium.

Although such automatic irrigation systems have solved many of the problems of hydroponic gardening, difficulties have remained. Some units, for example, have required cycles of plugging in and unplugging of the pump to avoid over-supply of nutrient solution, while others have proven to be too bulky and difficult to handle or unduly costly for the typical user. Most importantly, presently available hydroponic units have failed to provide a continuous and yet trouble-free means for supplying the growing medium with an adequate supply of the air-nutrient mixture.

SUMMARY OF THE INVENTION

In accordance with this invention there is provided a fully automatic hydroponic unit comprising a tray, having short legs and a perforated bottom, and a container into which the tray can be securely fitted with nutrient solution contained beneath the perforated bottom of the tray. A pump and tubing are disposed within a compartment of the tray, the tubing running downwardly into the nutrient solution and upwardly to a channel-shaped ledge formed by an enlarged upper portion of the tray. The tubing snaps into the channel portion around the sides of the tray. Nutrient solution enters through an aperture in the tube, is combined with air, and is pumped into the growing medium through a series of apertures in the tube portion snapped along the sides of the tray. A fill door is disposed adjacent the pump to allow filling of the container therethrough, and also to enable to user to visually check the level of nutrient solution without having to remove the tray.

It is a primary object of this invention to provide a compact and fully automatic hydroponic unit in which the pump and tubing are contained within the tray, with only a portion of tubing extending therefrom into the nutrient solution.

It is another object of this invention to provide a hydroponic unit using only a single piece of tubing to supply the air-nutrient solution mixture.

It is yet another object of this invention to provide a hydroponic unit which can be used to continuously supply an air-nutrient solution mixture to the plants, with no requirement that the pump be started and stopped according to cycles.

It is a further object of the invention to provide a hydroponic unit which can be easily converted to a wick system by removal of the pump and tubing and the drilling of holes in the tray bottom for holding of the wicks.

These and other objects of the invention will become apparent to those skilled in the art from a reading of the description of the preferred embodiment, as well as from examining the following described drawings.

DESCRIPTION OF PREFERRED EMBODIMENT

Figure 1:
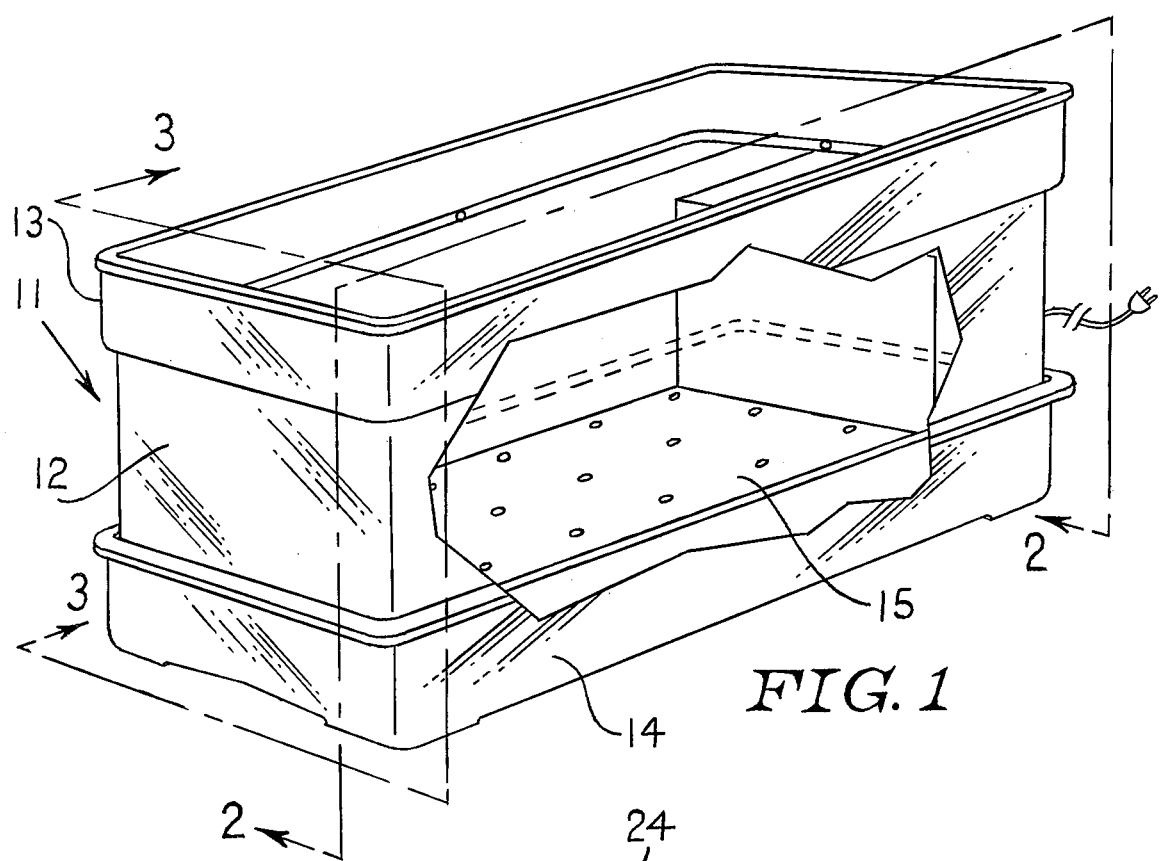
FIG. 1 is a perspective view of the hydroponic unit of this invention.

Referring to FIG. 1, hydroponic unit 11 comprises a high walled tray 12 having an enlarged upper portion 13, the tray being rectangular in shape and fitting securely within container 14. The tray 12 has a perforated bottom 15 on top of which vermiculite or the like is disposed to fill up the tray so as to provide a growing medium for plants. Preferably, hydroponic unit 11 is formed of plastic, such as polyethylene, with tray 12 and container 14 both being integrally molded in a single piece of such material. When so constructed, the hydroponic unit, including the pump and tubing described below, will be extremely light-weight and easily handleable.

Also, hydroponic unit 11 is preferably constructed of a size such that it can be fitted into or attached to a window box or the like. For example, the unit can have the following dimensions: 24"×8"×7".

Figure 2:
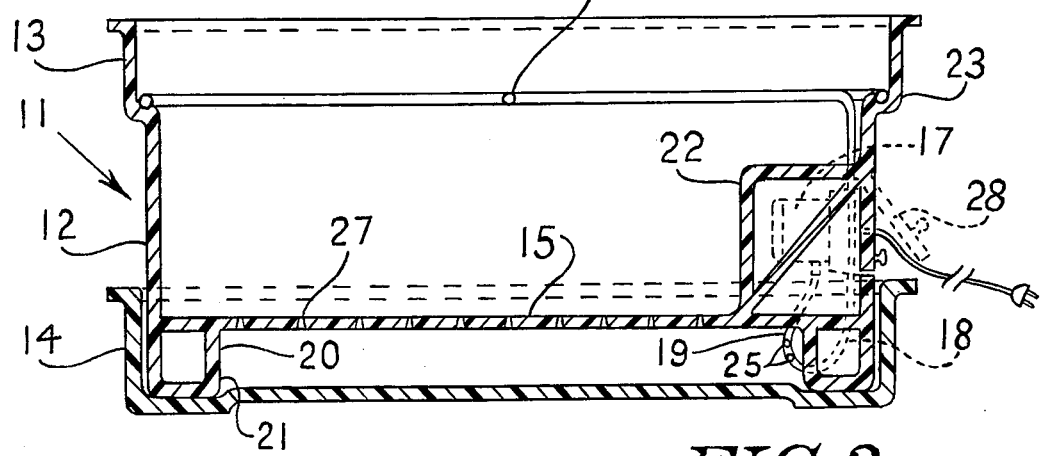
FIG. 2 is a sectional view of the hydroponic unit of FIG. 1 taken along line 2—2 thereof.
Figure 3:
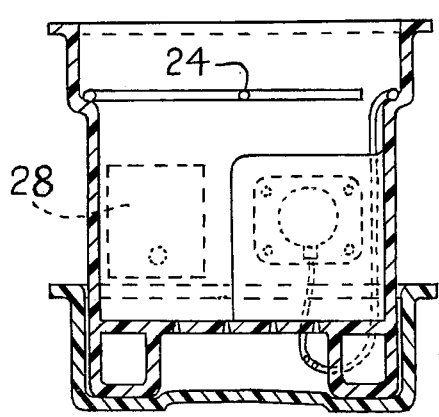
FIG. 3 is a sectional view taken along line 3—3 of FIG. 1.

As shown in FIGS. 2 and 3, hydroponic unit 11 is completely self-contained, with electric pump 17 and tubing 18 being contained within the tray, except for portion 19 of the tubing which extends through apertures in the tray into the enclosure of the container 14 holding the nutrient solution. The trays 12 has legs 19 fitting within recessed portion 21 of the container bottom, such that the tray will fit snugly into the container and will completely cover the nutrient solution contained therein. The tray effectively serves as a seal to prevent the formation of algae in the nutrient solution, which would occur if any portion of such solution were exposed to sunlight.

Electric pump 17 is disposed in a compartment defined by walls 22 above the maximum fill level of the container, and the tubing 18 runs through apertures in the tray into the nutrient solution and upwardly along the wall of the tray to the upper portion thereof, where the tubing is snapped into a channel portion 23 running along the sides of the inner walls of the tray. A series of holes 24 are formed in the tube portion which snaps into the channel-shaped portion, and two pairs of holes 25 are formed in the tube portion in contact with the nutrient solution, such that nutrient solution can be drawn through holes 25 into tube portion 19 and combined with air bubbles into a mixture which is pumped upwardly to the snapped-in portion of the tube and out of holes 24 into the vermiculite for absorption by plants. Excessive nutrient solution or water used to flush the system passes through the vermiculite and through perforations 27 in the bottom 15 of the tray to be combined with the nutrient solution remaining in the container 14. The perforations 27 are beveled downwardly such that small pieces of vermiculite or other growing medium will pass through the perforations and not become lodged therein so as to clog the drainage system.

A fill door 28 is disposed adjacent the electric pump compartment above the maximum fill level of the container 14, the door 28 being integrally molded of plastic with the tray 12 such that it will return by memory to a closed position from that of the position shown in dotted lines in FIG. 2. Fill door 28 not only allows the container to be filled with nutrient solution therethrough, but also provides a means by which the user can check the level of nutrient solution without having to remove the tray from the container.

Figure 4:
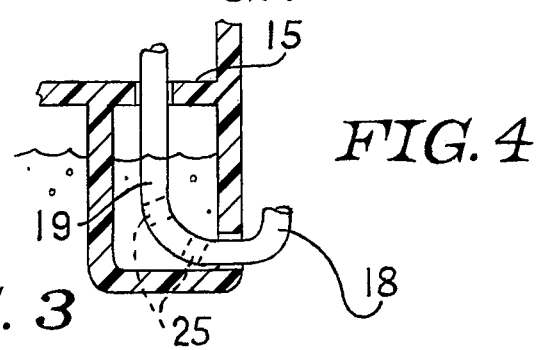
FIG. 4 is a fragmentary enlarged view of the tube portion extending into the nutrient solution.

Referring to FIG. 4, tube portion 19 of tubing 18 represents the only portion of tubing 18 not contained within tray 12. Portion 19 has holes 25 passing through adjacent walls of the tubing such that nutrient solution can flow into the tubing and be combined with air and pumped upwardly to the channel-shaped portion and out the series of holes 24. No other tubing or combination of air and water tubes or the like or any type of clamping means is necessary in accordance with this invention. Holes 25 in tube portion 19 permit the entry of sufficient amounts of nutrient solution into the tubing and allow mixing thereof with air bubbles to provide an optimum mixture of air and nutrient solution for growing plants. The use of two pairs of holes 25 also allows air bubbles to enter the nutrient solution in sufficient number to aerate the solution and prevent algae formation. The diameter of holes 25 varies with pump pressure, and can be readily determined by the user, should a replacement pump be used. Holes 25 must be as close to the bottom of container 14 as possible, such that they will be below the level of nutrient solution even after the level of such solution has fallen due to evaporation.

Hydroponic unit 11 can be easily converted to a wick system using wicks specifically woven for hydroponic growing. According to the wick system, water and nutrients are drawn up the wick into the bed of growing medium, without the need for any pumping means. Accordingly, the electric pump 17 and tubing 18 can be quickly removed from the tray 12, and appropriate size holes can be drilled in the bottom 15 thereof to accomodate as many wicks as is desired. Preferably, partly pre-punched holes are molded into the bottom, such that the user need only push out the pre-punched portions. Should the user decide to return to an automatic irrigation system, reconversion of unit 11 can be quickly accomplished by blocking or plugging up the enlarged wick holes and replacing the electric pump 17 and tubing 18.

As shown in FIG. 2, electric pump 17 is completely enclosed by the walls of tray 12, as well as by inner wall 22. As a result, the sounds of the pump in operation will be completely muffled, and the unit can be used without disturbing the quietest of surroundings.

I claim:
1. A hydroponic unit comprising:
    a container for holding nutrient solution;
    a tray for holding growing medium, the tray having a perforated bottom and a lower portion shaped to fit securely within the container and to define an enclosed space for nutrient solution between the underside of the tray bottom and the upper surface of the container bottom,
    an air pump contained entirely within the tray in a compartment positioned above the enclosed space between the tray and container and below the top of the tray; and
    a tube running from the pressure side of the pump downwardly into the enclosed space between the tray and container and then up the side of the tray to an upper level thereof, and along a peripheral supporting ledge on the inner sidewalls of the tray, said tube having a series of spaced-apart liquid exit apertures along the portion of the tube disposed at the upper level of the tray, and at least one liquid entry aperture at the portion which extends into the enclosed space between the tray and container, such that pressurized air flowing through the tube draws nutrient solution into the tube through the liquid entry aperture and dispenses an air-nutrient solution into said growing medium through the liquid exit apertures.

2. The hydroponic unit of claim 1 wherein the tray has short legs and an enlarged upper portion defining a channel-shaped ledge between the enlarged and unenlarged poritons of the tray, such that the tube can be snapped into the channel-shaped portion along the sidewalls of the tray.

3. The hydroponic unit of claim 2 additionally comprising a fill door disposed adjacent to the pump above the enclosed space and providing access to the enclosed space for filling said space with nutrient solution.

4. The hydroponic unit of claim 1 wherein the tube portion extending into the enclosed space between the tray and container has two pairs of aligned holes drilled through adjacent walls thereof, for entry of nutrient solution into the tube.

5. The hydroponic unit of claim 1 wherein the pump and tubing can be removed from the tray, and the bottom of the tray is provided with a plurality of preformed aperture blanks which can be removed for insertion of a wick therethrough.

6. The hydroponic unit of claim 1 wherein the tray, container and tubing are molded of plastic.

7. The hydroponic unit of claim 1 wherein the unit has a box-like shape.

8. The hydroponic unit of claim 1 wherein the tray bottom completely covers the container, such that there is no exposure to sunlight and consequent formation of algae in the container.

* * * * *